United States Patent [19]

Nakasato

[11] Patent Number: 5,262,891
[45] Date of Patent: Nov. 16, 1993

[54] OPTICAL MICROSCOPE OF THE TRANSMISSION TYPE

[75] Inventor: Kanae Nakasato, Tokyo, Japan

[73] Assignee: Olympus Optical Co., Ltd., Tokyo, Japan

[21] Appl. No.: 874,050

[22] Filed: Apr. 24, 1992

[30] Foreign Application Priority Data

Apr. 30, 1991 [JP] Japan .................. 3-38684[U]

[51] Int. Cl.⁵ .................................. G02B 21/12
[52] U.S. Cl. ........................ 359/385; 315/DIG. 5
[58] Field of Search ............ 359/385, 387, 388, 389;
  313/619, 495, 493; 315/209 R, DIG. 5, DIG. 7

[56] References Cited

U.S. PATENT DOCUMENTS

| | | | |
|---|---|---|---|
| 3,137,761 | 6/1964 | Conradi et al. | 88/40 |
| 3,933,408 | 1/1976 | Reinert | 359/385 |
| 4,245,179 | 1/1981 | Buhrer | 313/493 |
| 4,272,702 | 6/1981 | Teshima et al. | 313/493 |
| 4,384,200 | 5/1983 | Taira | 250/205 |
| 4,855,646 | 8/1989 | Peckitt et al. | 359/385 |
| 4,955,978 | 9/1990 | Hayashi | 359/385 |
| 4,967,118 | 10/1990 | Vrataki et al. | 313/619 |
| 5,119,233 | 6/1992 | Hayashi | 359/390 |
| 5,173,642 | 12/1992 | Matsumoto et al. | 315/209 R |

*Primary Examiner*—Jon W. Henry
*Attorney, Agent, or Firm*—Frishauf, Holtz, Goodman & Woodward

[57] ABSTRACT

An optical microscope of the transmission type for illuminating a sample according to the bright-field illumination method and for observing light passing through the sample includes a microscope body, objectives attached to the microscope body and having an optical axis, a stage serving to support the sample facing the objective used and attached, movable along the optical axis, to the microscope body, and a plane fluorescent lamp unit attached, movable along the optical axis, to the microscope body and serving to bright-field illuminate the sample through the stage. The unit includes a container provided with transparent panels, plane fluorescent layers formed on inner faces of the upper and lower panels of the container and spread substantially perpendicular to the optical axis.

9 Claims, 5 Drawing Sheets

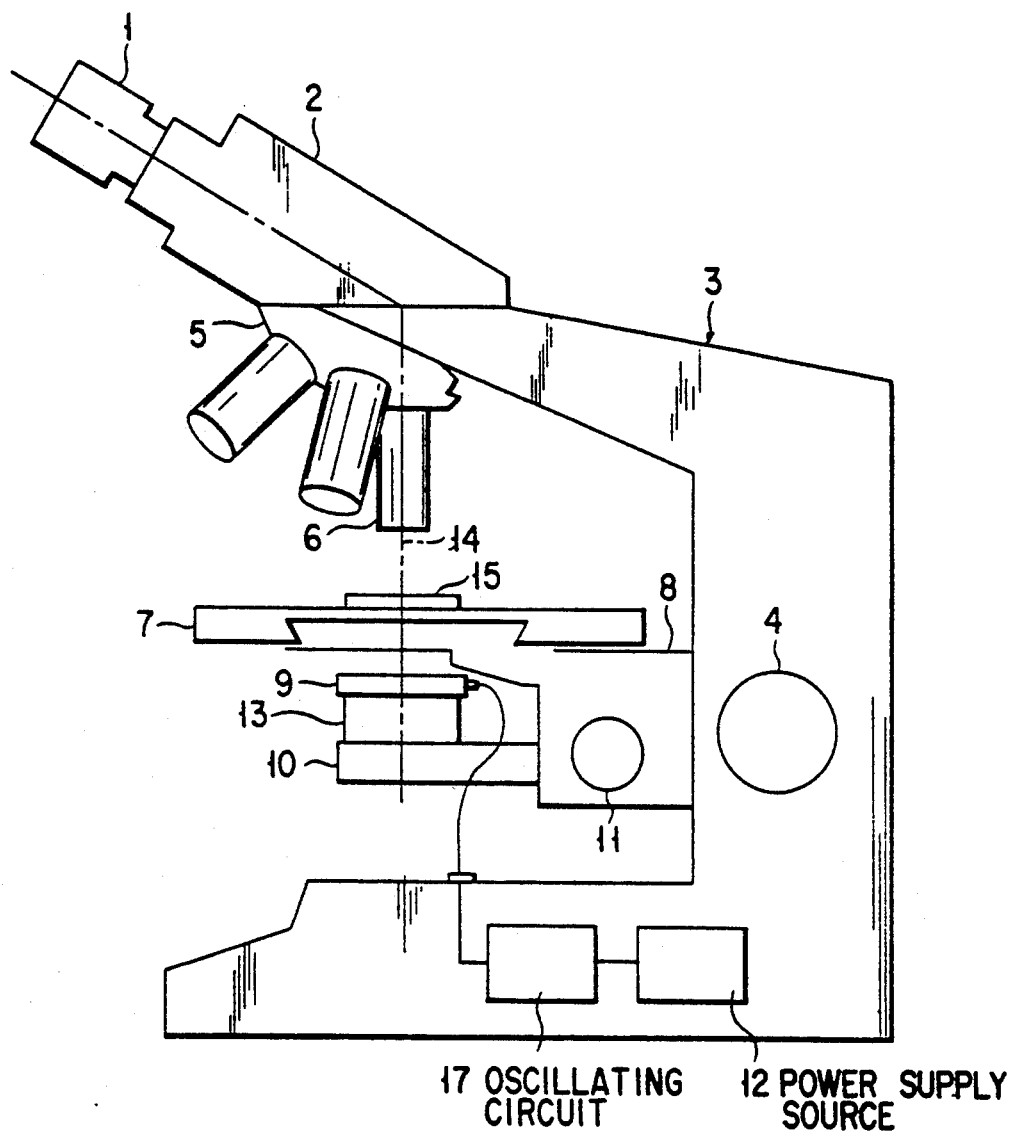
F I G. 1

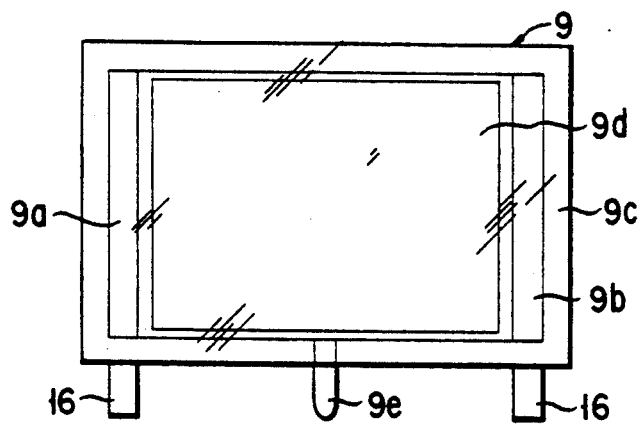
F I G. 2
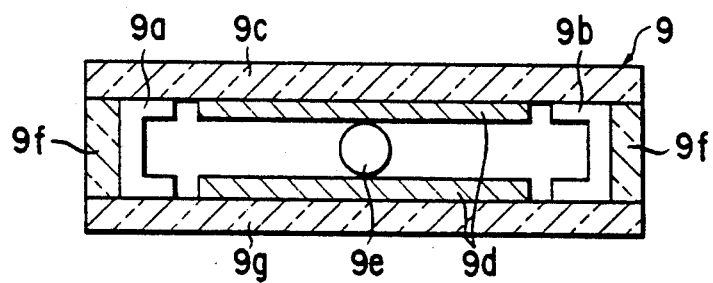
F I G. 3
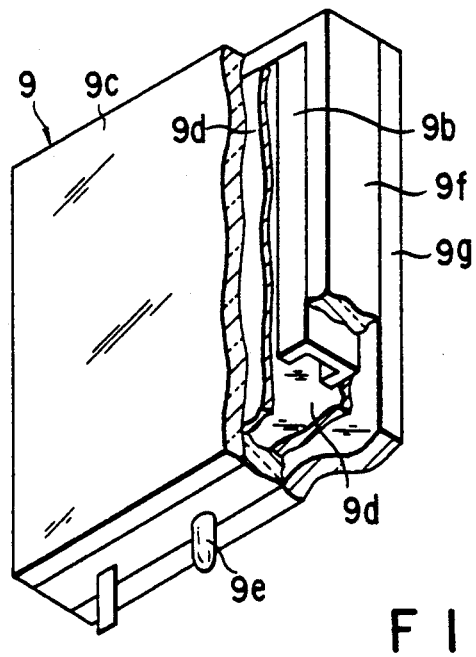
F I G. 4

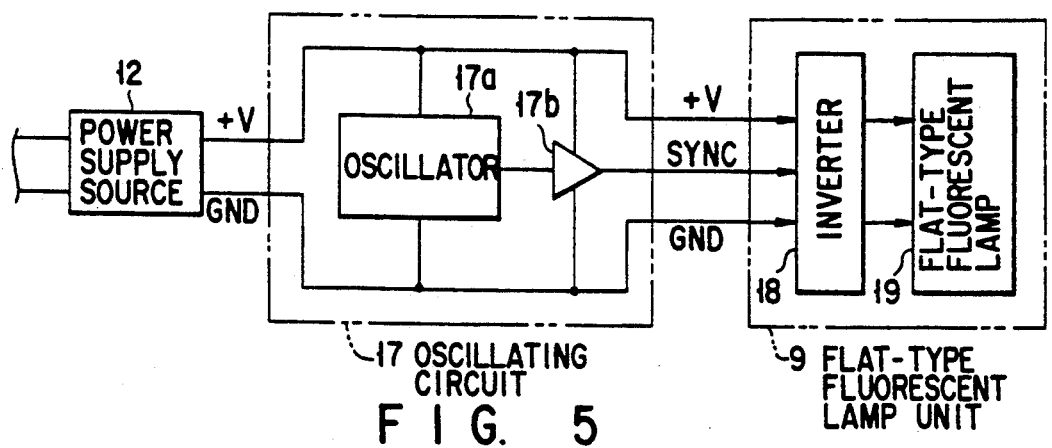
F I G. 5
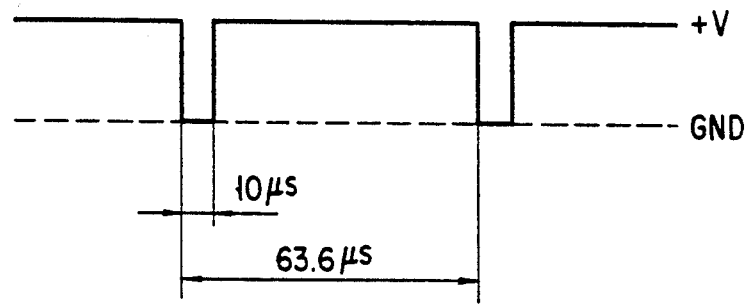
F I G. 6
| 70 | 83 | 78 |
| --- | --- | --- |
| 84 | 100 | 92 |
| 70 | 76 | 75 |
F I G. 7

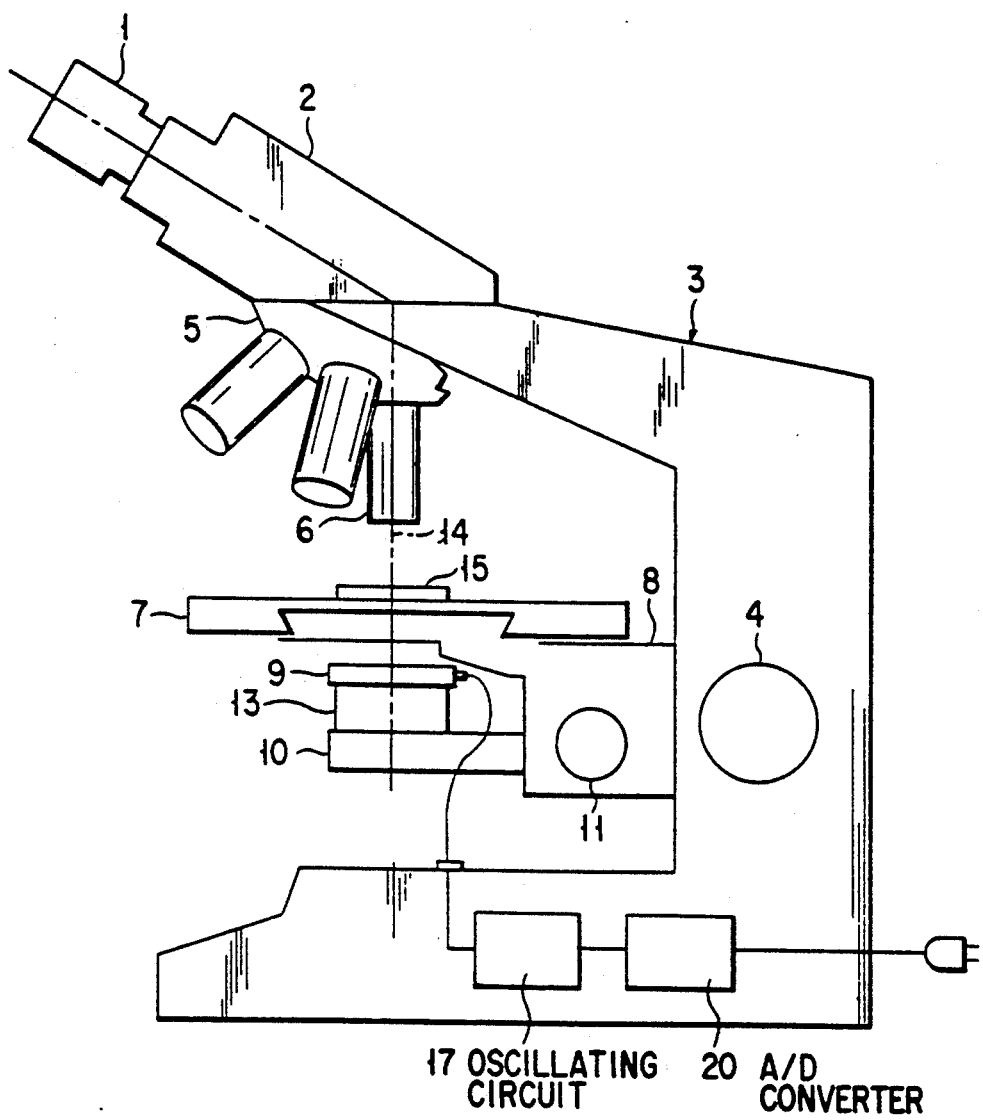
F I G. 8

OPTICAL MICROSCOPE OF THE TRANSMISSION TYPE

BACKGROUND OF THE INVENTION

1. Field of the Invention

The present invention relates to an optical microscope of the transmission type for illuminating a sample according to the bright-field illumination method and observing light passing through the sample.

2. Description of the Related Art

Most of the conventional illuminating means for the optical microscope use a halogen lamp of about 20-100W as their light source to uniformly illuminate the sample according to the Koehler's illumination method. The illuminating means of this type comprises the halogen lamp which serves as the light source, a lighting power source for the halogen lamp, and an optical system including a collector lens, a diffusing plate, bright-field and brightness diaphragms and a condenser lens. Light emitted from a filament of the halogen lamp is converted into parallel rays through the optical system to illuminate the surface of the sample.

According to this Koehler's illumination method, the sample can be uniformly illuminated. In addition, the sample cannot be damaged when it is illuminated for a long time because it can be positioned out of the point on which heat emitted from the filament of the halogen lamp is concentrated.

The illuminating means used for the Koehler's illumination method is very complicated and it needs various kinds of optical and mechanical components. This makes the cost of the illuminating means high. Further, the optical components must be adjusted along an optical axis. This also makes the steps of making the illuminating means complicated and its making cost high.

Furthermore, the power source for the halogen lamp needs a power of about 20-100W. Therefore, the microscope can be used only near a commercial power source. When it is to be used outdoors, some accessories such as the generator must be brought together with the microscope.

SUMMARY OF THE INVENTION

The object of the present invention is therefore to provide an optical microscope of the transmission type provided with an illuminating means, lower in cost, capable of making unnecessary the complicated steps of adjusting optical components along the optical axis, enabling the microscope to be used outdoors, and also enabling a sample to be uniformly illuminated.

According to a preferred aspect of the present invention, there can be provided an optical microscope of the transmission type intended to illuminate a sample according to the bright-field illumination method and observe light passing through the sample, wherein a plane fluorescent lamp unit whose light emitting source is parallel glow discharge generated between a pair of electrodes housed and opposed in the lamp is positioned, as a bright-field illuminating source, lower than the focus depth of an objective used when the objective is focused on the sample.

According to this embodiment, the parallel glow discharge caused between the pair of opposed electrodes can be used as an exciting source and the plane fluorescent lamp excited by the source can be used as a bright-field illuminating source. Different from those lamps which have a coil-shaped light emitting element, therefore, it has a light distribution of both enough depth and surface area when it serves as a light emitting source, thereby enabling the sample to be uniformly illuminated. In addition, it cannot emit any high heat, as seen in the case of the halogen and tungsten lamps. This prevents the sample from being damaged by heat.

Further, the light emitting source can illuminate the sample directly through bright-field. Different from the case of the Koehler's illumination method therefore, optical components such as the collector lens and bright-field and brightness diaphragms are not needed, thereby making the cost of the illuminating means lower. Furthermore, the complicated steps of adjusting these optical components along the optical axis are not needed. Still further, the plane fluorescent lamp unit can use the parallel glow discharge and power consumed by this parallel glow discharge can be made quite smaller. This enables the plane fluorescent lamp unit to be driven by cells and makes it unnecessary to bring the generator and other accessories together with the microscope when this microscope is to be used outdoors.

Still further, the plane fluorescent lamp unit can be positioned lower than the focus depth of the objective used when the objective is focused on the sample. This prevents the coating unevenness of fluorescent matter coated on inner faces of the plane fluorescent lamp unit from entering into the eye of the operator when he views the sample through the microscope. His sample observation through the microscope cannot be disturbed accordingly. This problem is not caused in the case of the conventional illuminating means used for the Koehler's illumination method, because the halogen lamp and others are set quite remote from the sample so as to prevent the sample from being heated by heat emitted from these components.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a side view schematically showing the optical microscope of the transmission type according to an embodiment of the present invention;

FIG. 2 is a plan showing an example of the plane fluorescent lamp;

FIG. 3 is a sectional view showing the plane fluorescent lamp in FIG. 2;

FIG. 4 is a perspective view, partly sectioned, showing the plane fluorescent lamp in FIG. 2;

FIG. 5 is a block diagram showing an example of the lamp-lighting power source;

FIG. 6 shows an example of the rectangular wave oscillated from an oscillator to control parallel glow discharge;

FIG. 7 is a plan showing the fluorescent plane of the plan fluorescent lamp divided into three equal parts in horizontal and vertical directions, wherein brightnesses of the nine equal parts are measured and their relative values are put in these nine parts; and FIGS. 8 and 9 are side views of the modified optical microscopes, respectively.

DETAILED DESCRIPTION OF THE PREFERRED EMBODIMENTS

Figure 9:
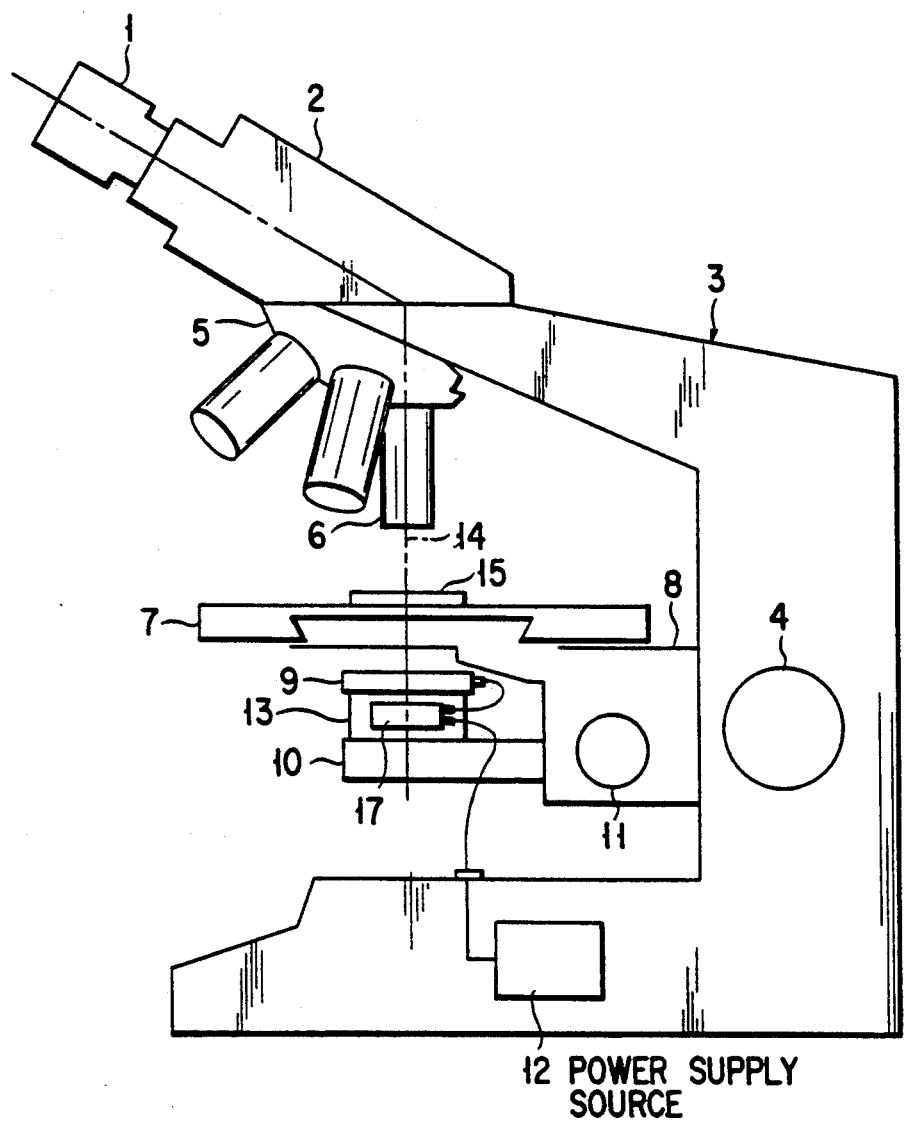

FIG. 1 is a side view schematically showing the optical microscope of the transmission type according to an embodiment of the present invention. A plane or flat fluorescent lamp stage 10 is attached, movable up and down, to a stage support 8 by a well-known system. Placed on the stage 10 is a mount 13, on which a plane fluorescent lamp unit 9 which will be described later is mounted. A handle 11 is rotatably attached to the stage support 8 and when this handle 11 is rotated, the stage 10 can be moved up and down relative to the stage support 8 by a well-known system such as a pinion-rack system. The mount 13 and the plane fluorescent lamp unit 9 can be moved up and down together with the stage 10. A lighting power source or low pressure DC power source 12 of 5V, for example, which is mounted in or on a microscope body 3, is electrically connected to the plane fluorescent lamp unit 9 through an oscillating circuit 17 and lead lines. A cell box in which cells are detachably housed may be used as the power source 12. Alternately, the oscillating circuit 17 may be mounted in the body 3 and connected to the commercial AC power source by a plug through an A/D converter 20 by which alternating current supplied from the commercial AC power source is converted into direct current, as shown in FIG. 9. The converter 20 may be mounted in or on the body 3.

An X- and Y-axes stage 7 is located above the plane fluorescent lamp unit 9 with a small space interposed between them. This stage 7 is supported, movable along X and Y axes or in horizontal directions, by the stage support 8. A sample or specimen 15 is placed on the stage 7. At least that area of the stage 7 on which the sample 15 is placed is made transparent, so that the sample 15 on the X- and Y-axes stage 7 can be illuminated through the bright-field by light emitted from the plane fluorescent lamp unit 9. It may be instead arranged that the sample receiving area of the stage 7 is made as a hole and that the sample 15 on the stage 7 can be illuminated through the hole.

The stage support 8 is supported by a microscope body 3 and it can be moved up and down or in a direction Z by a Z handle 4. A revolver 5 is attached, rotatable, to the rear end of the microscope body 3. A plurality of objectives 6, different in magnification, are attached to the revolver 5 to successively come just above the sample 15 as the revolver 5 is rotated. As the result, the incident illuminating light passes through the sample 15 and enters into one of the objectives 6 which is just above the sample 15. The objectives 6 cooperate with a viewing body tube 2 Attached to the top of the microscope body 3 and an eyepiece 1 to form an imaging optical system. The operator can thus view the magnified image of the sample 15 through the eyepiece 1.

The plane fluorescent lamp unit 9 will be described with reference to FIGS. 2 to 5.

As described above, the plane fluorescent lamp unit 9 is used as a bright-field illuminating means for the microscope. It includes a plane fluorescent lamp 19 and an inverter circuit 18. The lamp 19 includes a pair of opposed electrodes and parallel glow discharge is created between them and used as an illuminating source. The liquid crystal plane back light (product name: BLU - 1A) made by Sanyo Electronic Corporation can be used as the plane fluorescent lamp 19.

A glass container is formed by upper and lower glass panels 9c and 9g and side glass panels 9f. These glass panels are made transparent. A cathode 9a and an anode 9b are housed opposed ends thereof. Each of these cathode 9a and anode 9b is made by a slender metal plate and it is shaped to have a U-section. They are arranged parallel to each other in the glass container with their open sides opposed to each other. Fluorescent films 9 are formed almost all over inner faces of the upper and lower glass panels 9c and 9g by the printing manner, for example. Each of the fluorescent films 9d is formed by plural square pieces of fluorescent film arranged. Lead sections 16 connected to those lead lines which extend to the power source 12 (FIG. 1) are fixed to the parallel electrodes 9a and 9b. The space in the glass container is exhausted through an exhaust pipe 9e and then filled with low pressure exciting gases such as argon and neon. According to this plane fluorescent lamp, DC voltage is applied between the pair of opposed parallel electrodes 9a and 9b to generate parallel glow discharge between them and this parallel glow discharge is used as a source for exciting the fluorescent matter.

It is tried at first that parallel glow discharge is uniformly caused between the cathode 9a and the anode 9b. When this state is left as it is, however, current becomes large at once and runs like a line through an extremely limited area. In order to avoid this, the switch is turned on and off at very high speed when current is supplied from the lamp lighting power source to the plane fluorescent lamp 19. The parallel glow discharge alone is thus repeatedly caused.

An example of this lamp lighting power source is shown as a block diagram in FIG. 5. A current supply source 12 comprises an AC adapter or cells. Currents of +V and GND are supplied from the current supply source 12 to an oscillator 17, which oscillates such rectangular waves as shown in FIG. 6. The switch is turned on for a time of 53.6 μs and off for a time of 10 μs in thus example. These on- and off-times are alternately repeated. The rectangular waveform is amplified by a buffer 17b and then outputted as SYNC signal. The oscillator 17a and buffer 17b constitute an oscillating circuit 17 +V, GND and SYNC signals are applied to the inverter circuit 18 of the unit 9 and the parallel glow discharge is caused between the paired parallel electrodes 9a and 9b in response to outputs of the inverter circuit 18. The plane fluorescent lamp 19 is thus lighted.

According to this embodiment, the plane fluorescent lamp 19 uses, as its exciting source, the parallel glow discharge caused between the paired opposed electrodes 9a and 9b and this plane fluorescent lamp 19 is used as the bright-field illuminating source. Therefore, the illuminating source has neither depth nor surface distribution. This enables the sample 15 to be uniformly illuminated. In addition, the illuminating source emits no high heat, as seen in the case of halogen and tungsten lamps. This prevents the sample 15 from being damaged by heat.

Further, various kinds of optical components are not need. This enables the cost of the microscope to be made lower. Furthermore, the complicated steps of adjusting these various kinds of optical components along the optical axis are not needed. Still further, current consumed by the parallel glow discharge can be made smaller. This enables the plane fluorescent lamp 19 to be driven by cells.

As described above, fluorescent material is coated on the inner faces of the glass panels 9c and 9g. According to the inventor of the present invention, coating unevenness is viewed through the microscope when the upper fluorescent material-coated face come in the depth of focus of the objective 6 used. When the magnification of the objective used is a multiple of 1, the focus depth of the objective is about 1.5 mm and when it is a multiple of 2, the focus depth of the objective is about 0.4 mm. When the upper fluorescent material-coated face comes near the sample 15 and in the focus depth of the objective, the image of the sample 15 overlaps those of the fluorescent material-coated faces. The coating unevenness of fluorescent matter therefore disturbs the observation of the operator through the microscope. In addition, there is a possibility that the coating unevenness of fluorescent matter is taken for that of the sample 15.

Even when the plane fluorescent lamp stage 10 is lifted to the uppermost position by the handle 11, therefore, the top surface of the plane fluorescent lamp 19 is adjusted to locate lower than the focus depth of the objective 6 used. This prevents the image of the fluorescent material-coated face from being overlapped that of the sample 15. In order to uniformly illuminate the sample 15, it is preferable that the plane fluorescent lamp 19 is set substantially perpendicular to an optical axis 14 of the objective 6.

More concrete experimental results obtained will be described.

The voltage (or +V) is set +5V and rectangular waves shown in FIG. 6 are oscillated to light the plane fluorescent lamp 19 shown in FIGS. 2 through 4. Current consumed by the plane fluorescent lamp 19 is about 110 mA in this case. When those consumed by the oscillator 17a and the buffer 17b are added, therefore, the total of current consumed is less than 1W. This enables dry cells to be used as the current supply source 12.

The size of the light-emitting area of the plane fluorescent lamp 19 is set 21.2×16.3 mm. enough to illuminate the field of the common objective 6 used.

The light-emitting area of the plane fluorescent lamp 19 is divided like a check into nine equally-squared parts. The brightness of each of these nine parts is measured and results thus measured are shown as relative values in FIG. 7. The values at the peripheral parts denote percentages when the brightness of the center part is 100%.

As understood from the results shown in FIG. 7, a brightness of 70% can be obtained minimum. This causes no practical problem when the plane fluorescent lamp 19 is used as the bright-field illuminating light source. In addition, the light-emitting area has a color temperature of about 7000K, which makes the plane fluorescent lamp 19 suitable for bright-field observation through the microscope.

The plane fluorescent lamp unit 9 was set at the position shown in FIG. 1 and the magnification of the objective 6 used was variously changed. Illumination intensity at the eyepiece 1 was measured in these cases. Results thus obtained are shown in table 1.

TABLE 1

| Magnification of the Objective 6 | Illumination Intensity (LUX) at the Eyepiece |
|---|---|
| 1x | 2.4 |
| 2x | 2.5 |
| 4x | 1.7 |
| 10x | 1.8 |
| 20x | 0.9 |
| 40x | 0.5 |

If an illumination intensity of about 1 LUX is obtained, the magnified image of the sample can be clearly viewed or observed. When the magnification of the objective 6 is 40 times, however, the magnified image of the sample illuminated is a little dark to view it through the microscope but it is bright enough in other cases to clearly view it through the microscope.

According to the conventional Koehler's illumination method, the illumination intensity at the eyepiece was inversely proportional to the square of the magnification of the objective. When a case the magnification of the objective is one time is compared with another case it is 40 times, therefore, the one has an illumination intensity larger than 1000 times. When the objective is to be changed, therefore, the voltage of the halogen lamp, brightness, the ND filter and others must be readjusted.

According to this embodiment of the present invention, however, the illumination intensity at the eyepiece 1 changes only several times even if the magnification of the objective is changed to a considerable extent. This change in the illumination intensity can be naturally adjusted by the eye of human being. Even when the objective is changed, therefore, it is unnecessary to carry out readjustment.

When substantially white fluorescent material is coated on the inner faces of the upper and lower glass panels, the sample to be observed can be made clear on the white background, thereby making it easier to position the sample.

According to the embodiment of the present invention, it has been found that the illumination intensity at the eyepiece 1 is lowered only by about 0.2 LUX even when the plane fluorescent lamp 9 is further moved down by about 2 mm after illumination intensity measurement is carried out as described above. Therefore, an X- and Y-axes stage made of transparent glass and having no hole can be used instead of the one made by, as described above, an opaque glass plate and having an illuminating through-hole. When this transparent glass-made stage is used, no broken pieces of the slide glass fall on it, thereby making it easier to clean it.

Although the present invention has been described as being applied mainly to the microscope of the transmission type suitable for observing organisms, it can also becomes more important to position the plane fluorescent lamp 19 lower than the focus depth of the objective.

According to the present invention, the plane fluorescent lamp in which parallel glow discharge is created between the paired opposed electrodes can be used as the bright-field illuminating source. Different from those lamps which have coil-shaped light emitting elements, therefore, it has neither depth nor surface distribution, thereby enabling the sample to be uniformly illuminated. In addition, it emits no high heat, as seen in the case of the halogen and tungsten lamps. This prevents the sample from being damaged by heat.

Further, the illuminating source can directly illuminates the sample through bright-field in the case of the above-described embodiment. Different from the Koehler's illumination method, therefore, no optical components such as the collector lens, view field and brightness diaphragms are needed, thereby making the cost of the microscope lower. Furthermore, no complicated steps of adjusting these optical components along the optical axis are needed. Still further, power consumed can be made smaller microscope is used outdoors.

Still further, the plane fluorescent lamp can be set lower than the focus depth of the objective used. Therefore, the coating unevenness of fluorescent material coated on inner faces of the plane fluorescent lamp does not come into the eye of the observer while he is viewing the sample through the microscope. This prevents his sample observation from being disturbed. When the above-described plane fluorescent lamp is used to carry out bright-field illumination, relatively small change can be provided in the illumination intensity at the eyepiece even if the magnification of the objective used is changed to a considerable extent. This makes it unnecessary to readjust the plane fluorescent lamp if the objective is exchanged with another one.

Although the plane fluorescent lamp has been used as the illuminating means for the optical microscope of the transmission type, other plane light source lamps such as the electroluminescence lamp can be used.

In the modified microscope of the present invention shown in FIG. 8, the oscillating circuit 17 is mounted in the mount 13, which is electrically connected to the power source 12 in the mirror body 3.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical microscope of the transmission type for illuminating a sample according to the bright-field illumination method and observing light passing through the sample, comprising:
    an objective;
    means for supporting the sample; and
    a plane fluorescent lamp unit including a plane fluorescent lamp having a plane fluorescent layer and means for exciting the plane fluorescent layer to generate light-emitting glow discharge, wherein said plane fluorescent layer is positioned out of the focus depth of the objective used to illuminate the sample through said bright-field illumination.

2. The optical microscope of the transmission type according to claim 1, wherein:
    said sample supporting means is arranged between the objective and the plane fluorescent lamp unit to support the sample thereon so as to face the sample to the objective used, and
    said sample supporting means has a stage for allowing light emitted from the plane fluorescent lamp unit to be transmitted through the sample.

3. The optical microscope of the transmission type according to claim 2, wherein said stage has a transparent area on which the sample is placed.

4. The optical microscope of the transmission type according to claim 1, further including:
    a microscope body for supporting the objective and supporting means, and
    an oscillating circuit mounted in the microscope body for driving the plane fluorescent lamp unit.

5. The optical microscope of the transmission type according to claim 1, further including:
    a mount on which the plane fluorescent lamp unit is mounted, and
    an oscillating circuit mounted in the mount for driving the plane fluorescent lamp unit.

6. The optical microscope of the transmission type according to claim 1, further including:
    a microscope body for supporting the objective and supporting means, and
    power source means mounted in the microscope body for applying an electric power to the plane fluorescent lamp unit.

7. The optical microscope of the transmission type according to claim 1, further including means for applying voltage intermittently to the plane fluorescent lamp unit.

8. The optical microscope of the transmission type according to claim 7, wherein said voltage applying means includes:
    a DC voltage power source, and
    means for converting a voltage applied from the DC power source into an alternating voltage and for supply the alternating voltage to the plane fluorescent lamp unit.

9. The optical microscope of the transmission type according to claim 1, wherein said fluorescent layer is on an inner face of the plane fluorescent lamp and is made of fluorescent material capable of emitting fluorescence.

* * * * *